United States Patent [19]

Kramer

[11] Patent Number: 4,642,038
[45] Date of Patent: Feb. 10, 1987

[54] CONTINUOUS IN SITU FIBERIZATION SUBSTRATE MATERIAL MECHANISM

[75] Inventor: Nathan R. Kramer, Marina del Rey, Calif.

[73] Assignee: Hughes Aircraft Company, Los Angeles, Calif.

[21] Appl. No.: 801,438

[22] Filed: Nov. 25, 1985

[51] Int. Cl.⁴ .............................................. B29C 63/22
[52] U.S. Cl. ........................................ 425/93; 264/22; 264/313; 264/DIG. 47; 425/101; 425/223; 425/230; 425/270; 425/272; 425/274
[58] Field of Search .................. 425/93, 96, 101, 223, 425/230, 269, 270, 274, 272; 264/22, 23, 299, 301, 310, 313, DIG. 47

[56] References Cited

U.S. PATENT DOCUMENTS

| 2,133,821 | 10/1938 | Kratz | 425/223 X |
|---|---|---|---|
| 2,544,622 | 3/1951 | Ulmer et al. | 264/23 X |
| 2,837,770 | 6/1958 | Herrmann et al. | 425/223 X |
| 2,939,223 | 6/1960 | Smith | 264/23 X |
| 3,266,558 | 8/1966 | Griffon | 425/223 X |
| 3,305,613 | 2/1967 | Spence | 264/299 X |
| 4,127,624 | 11/1978 | Keller et al. | 264/23 |
| 4,198,461 | 4/1980 | Keller et al. | 264/23 X |
| 4,397,907 | 8/1983 | Rosser et al. | 264/22 X |
| 4,403,069 | 9/1983 | Keller et al. | 264/23 X |
| 4,581,185 | 4/1986 | Kelchner, Jr. | 264/DIG. 47 |

Primary Examiner—Richard L. Chiesa
Attorney, Agent, or Firm—M. E. Lachman; A. W. Karambelas

[57] ABSTRACT

An in situ fiberization apparatus for continuously fiberizing belt shaped substrates by impregnation with fibrous material formed from fiber forming polymer solutions. The apparatus includes a belt substrate which is continually passed through a fiber forming solution at a constant rate. During passage of the substrate belt through the fiber forming solution, the apparatus provides continual oscillation of the belt. The oscillating or reciprocating motion of the belt substrate produces the conditions for flow-induced crystallization of fibers around and throughout the substrate material to thereby produce a fiber reinforced substrate.

17 Claims, 10 Drawing Figures

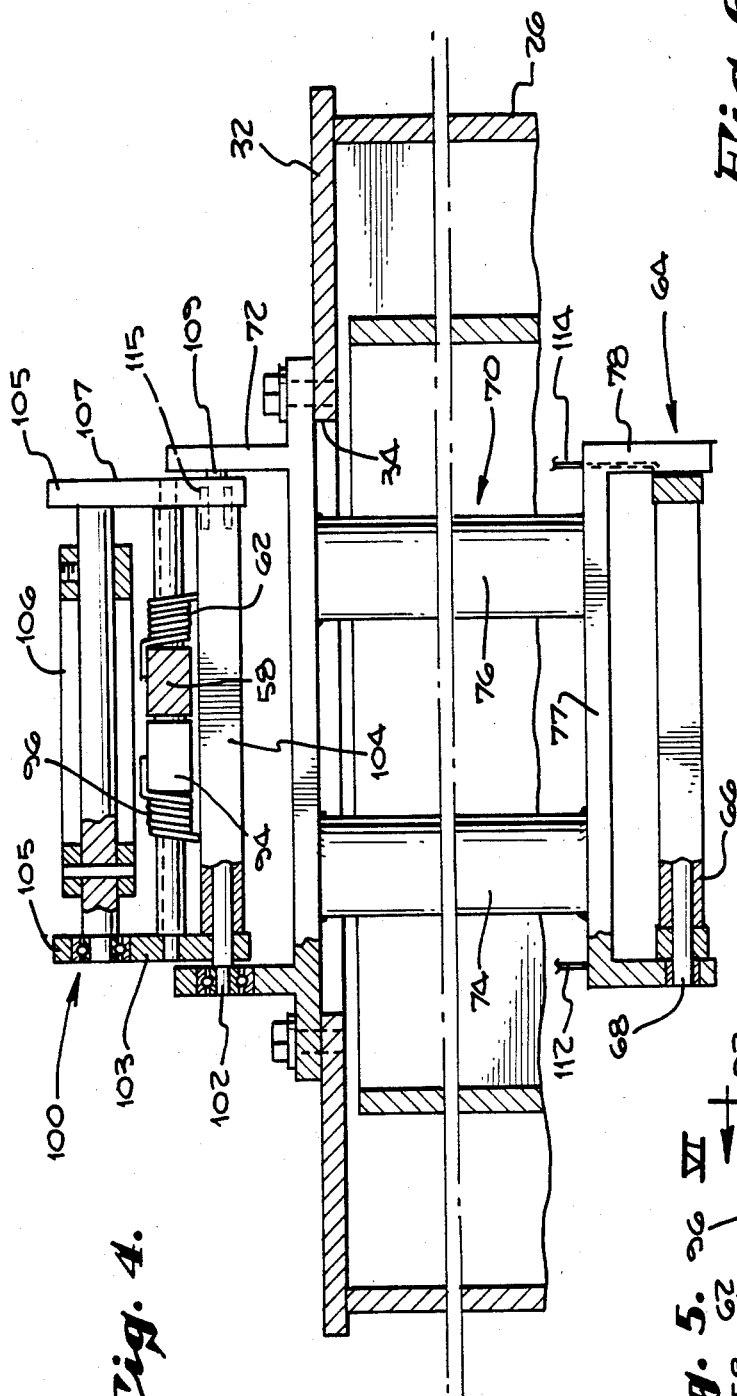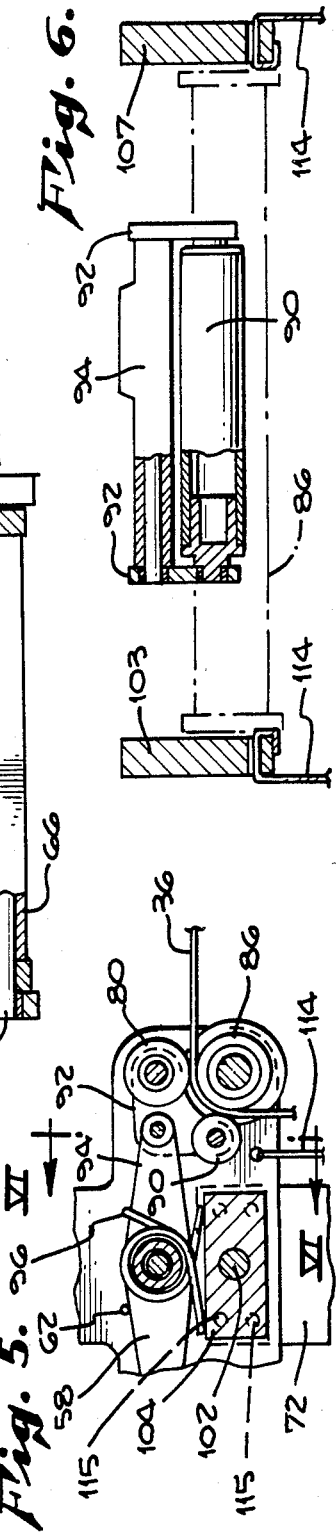

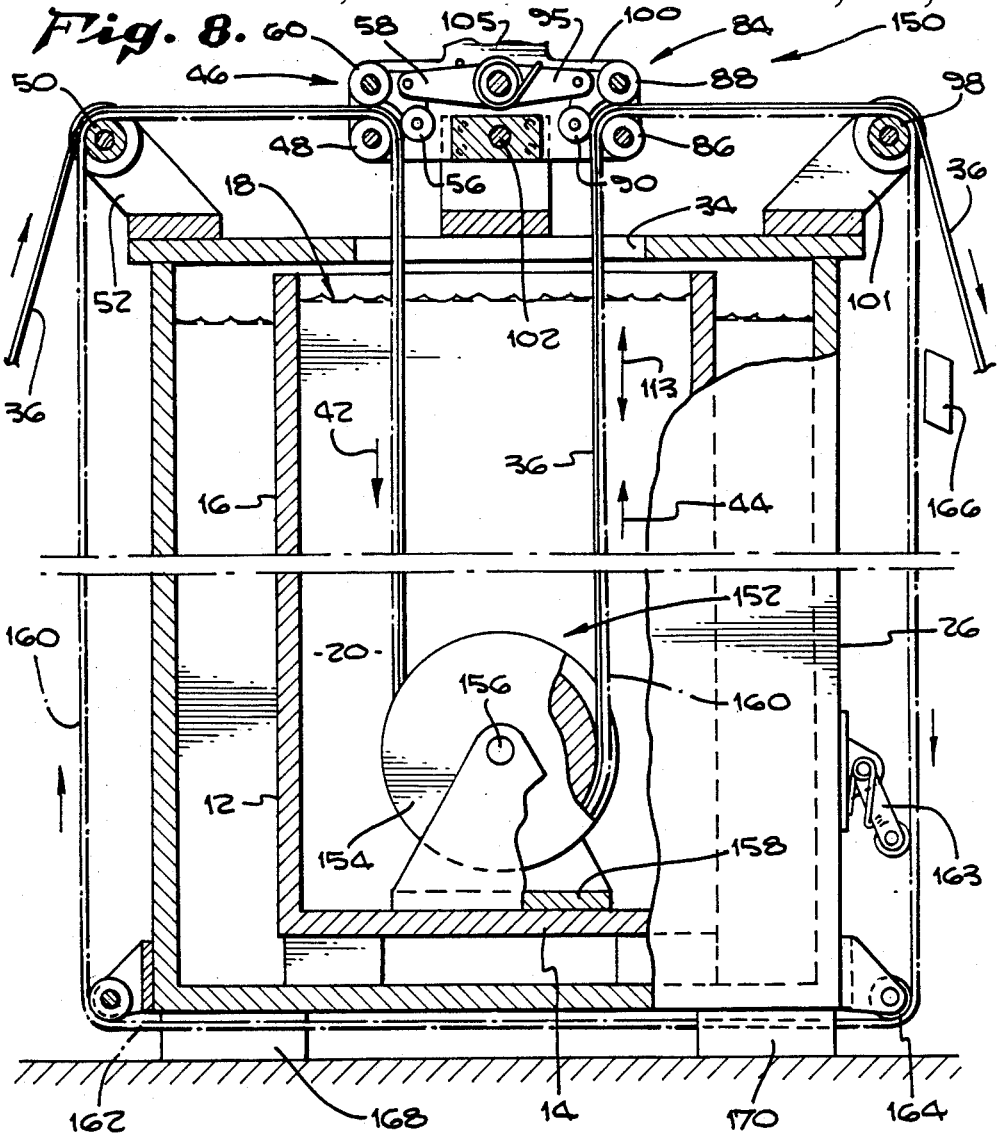
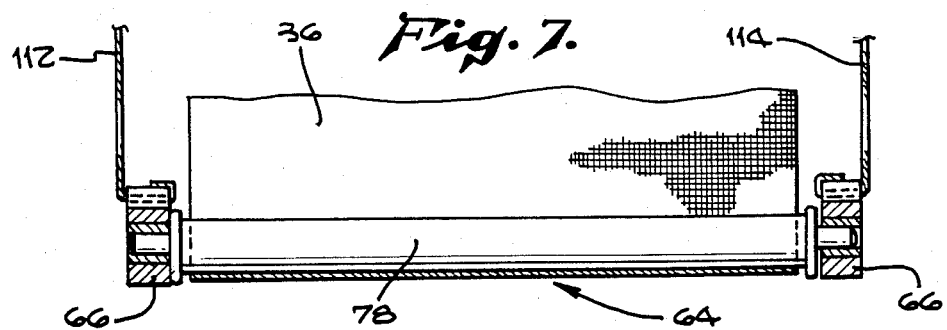

CONTINUOUS IN SITU FIBERIZATION SUBSTRATE MATERIAL MECHANISM

BACKGROUND OF THE INVENTION

1. Field of the Invention

This invention relates to coating and/or reinforcing various substrates with polymeric fibers formed from fiber forming polymer solutions. More particularly, this invention relates to an apparatus in which the polymeric fiber reinforcement and/or coating is applied to the substrate by oscillating the substrate as it is continously passed through a solution of fiber forming polymer.

2. Description of Related Art

Fabrics can be produced from polymers by weaving, knitting or non-woven techniques. All fabric-forming techniques require polymerization, polymer recovery and formation of filaments. In woven and knitted fabrics, the polymer is processed into a filament and then into a multi-filament yarn before being woven or knitted into a fabric by interlacement of warp and weft threads. Non-woven fabrics are manufactured from a web, sheet or batt of chopped fibers that are joined by mechanical, chemical or solvent processes. Barbed needles have been used to punch into a web of fibers to entangle them. The fibers can be bonded into a felt by applying heat, moisture and pressure to a sheet of fibers. The term non-woven is also applied to fabrics comprising a web of fibers held together by sticking. The non-woven fabrics are very soft but have very little overall strength. All of these fabric forming techniques are capital and labor intensive, requiring complex multi-stage processing to convert raw polymer stock into knitted or woven fabric or a non-woven fibrous sheet.

A one-step process for forming shaped, fibrous polymer networks is disclosed in U.S. Pat. Nos. 4,127,624; 4,198,461; 4,397,907; and 4,403,069. The process involves an in situ fiberization (ISF) technique based on agitation-induced crystallization of the fibers from solution. The fibers form a coherent, three-dimensional, isotropic network of crystalline fiber bundles. The three-dimensional mass of fibers is produced by cooling a container of the solution which is being agitated at sonic frequency. This ISF technicue can be used to form a fiber mass which may subsequently be impregnated with a curable polymeric resin to provide a fiber reinforced composite which is useful as a structural material or as a high strength encapsulant for electronic components. In addition, the fiber mass so formed may be broken into individual fibers or fiber bundles which are useful for forming papers, cloths, felts, mats, nonwoven fabrics, cordage, and the like.

Another important use for fibers formed by the ISF technique is as a coating and/or reinforcement for various substrates, such as loosely woven materials which require protection and strengthening. This procedure is commonly referred to as fiberizing or fiberization of the substrate. The fiberization of substrates is typically carried out by inefficient batch-type processes where the substrate is immersed in the polymer forming solution, agitated until the desired coating and/or impregnation of fibers has been achieved and then removed. In order to increase the commercial usefulness of ISF fiberization techniques, it would be desirable to provide a continuous production process in which the substrate to be fiberized is continually passed through the fiber forming solution in a manner which provides the desired fiber coating and/or impregnation.

SUMMARY OF THE INVENTION

In accordance with the present invention, an apparatus is disclosed and provided which is capable of continuously fiberizing various substrates with fibrous material produced from the fiber forming polymer solutions utilized in the known ISF techniques.

The present invention provides an apparatus in which a belt or continuous sheet of a substrate material is continually passed through a fiber forming solution at a constant rate. During passage of the belt substrate through the fiber forming solution, the belt is continually oscillated. The oscillating or reciprocating motion of the belt substrate interacts with the bulk polymer solution to provide fiberization of material on the belt.

The apparatus in accordance with the present invention basically includes a container having a bottom, sides and a top which define a fiber forming zone for holding the bulk fiber forming polymer solution. An access opening is provided in the top of the container to allow access into the fiber forming zone. First pulley means are provided for directing the belt substrate vertically down into the fiber forming zone through the access opening. Second pulley means located within the fiber forming zone are provided for receiving the belt from the first pulley means and directing the belt vertically upward and out of the fiber forming zone through the access opening. Third pulley means are provided for receiving the belt from the second pulley means. Means are also provided for introducing the belt into the fiber forming zone at a constant rate and for removing the belt from the fiber forming zone at the same constant rate.

As a particular feature of the present invention, a horizontal pivot bar is provided which is located above the second pulley means. The pivot bar includes a first end, a second end and a middle pivot point. The first pulley means and third pulley means are mounted to the first end and second end of the horizontal pivot bar, respectively. Pivot means are provided for pivoting the pivot bar about the middle pivot point to vertically move the first and third pulley means in a pivoting movement in opposite directions over a pivot distance and at a pivot frequency to provide oscillation or reciprocation of the belt as the belt passes through the polymer solution. The pivot distance and pivot frequency are selected so as to impart a sufficient oscillation frequency and amplitude to the belt as it passes through the polymer solution to provide the desired fiberization of the substrate belt.

As particular features of the present invention, the second pulley means located within the fiber forming zone may be either a single pulley or include a rocker arm having rocker arm pulleys mounted at each end for receiving the belt from the first pulley means and directing the belt to the third pulley means. The rocker arm assembly is designed to provide coordinated pivoting movement of the rocker arm with the horizontal pivot bar to reduce stresses on the belt which occur during oscillation.

As another feature of the present invention, rocker arm scraper means are provided for continually removing fibrous material which builds up on the rocker arm during pivoting movement of the rocker arm within the bulk polymer solution.

As an additional feature of the present invention, an embodiment for recovering bulk polymer is disclosed in which the apparatus includes a continuous belt and means are provided for continuously cycling the belt through the bulk polymer solution. A scraper is provided to continually remove the build-up of bulk polymer from the substrate. The bulk polymer is then further processed or otherwise used.

The above discussed and many other features and attendant advantages of the present invention will become apparent as the invention becomes better understood by reference to the following detailed description when considered in conjunction with the accompanying drawings.

BRIEF DESCRIPTION OF THE DRAWINGS

FIG. 4 is a sectional view of FIG. 2 taken in the IV—IV plane.

FIG. 5 is a partial detailed view of the pivot bar and pulley means shown in FIG. 2.

FIG. 6 is a sectional view of FIG. 5 taken in the VI—VI plane.

FIG. 7 is a sectional view of FIG. 2 taken in the VII—VII plane.

FIG. 8 is a sectional view of alternate preferred embodiments in accordance with the present invention.

DETAILED DESCRIPTION OF THE INVENTION

Figure 1:
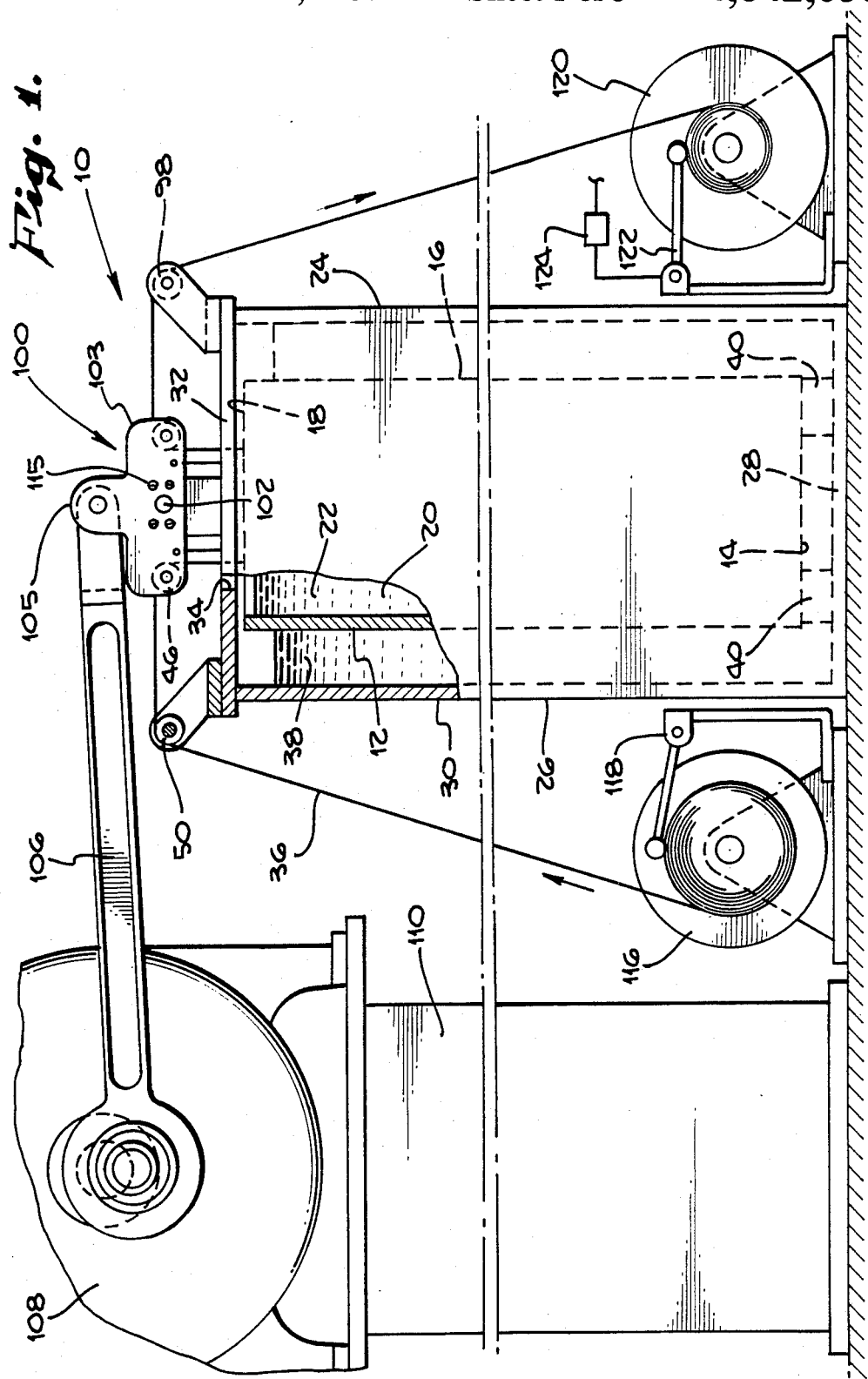
FIG. 1 is a partial sectional view of a preferred apparatus in accordance with the present invention.
Figure 2:
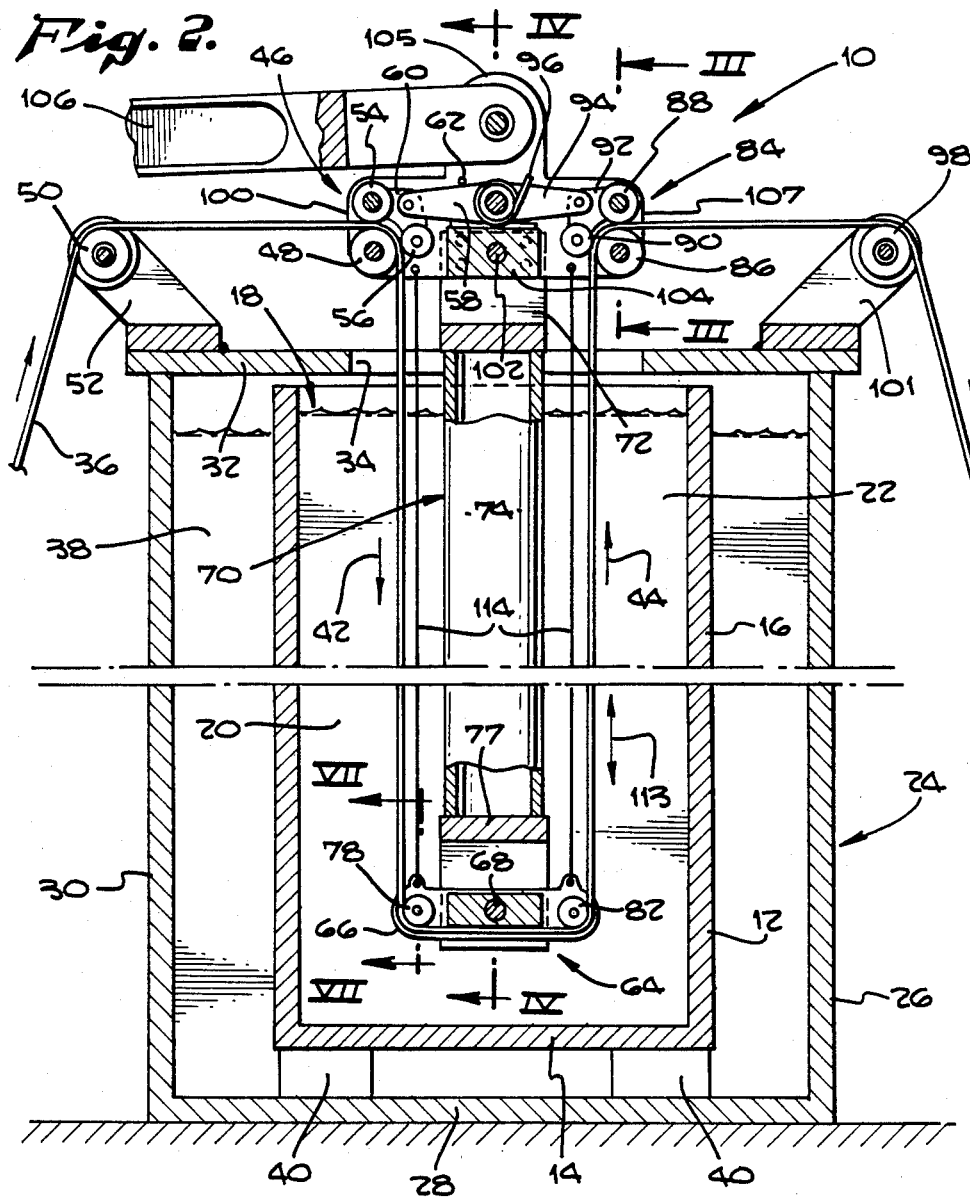
FIG. 2 is a more detailed sectional view of the preferred exemplary apparatus shown in FIG. 1.
Figure 3:
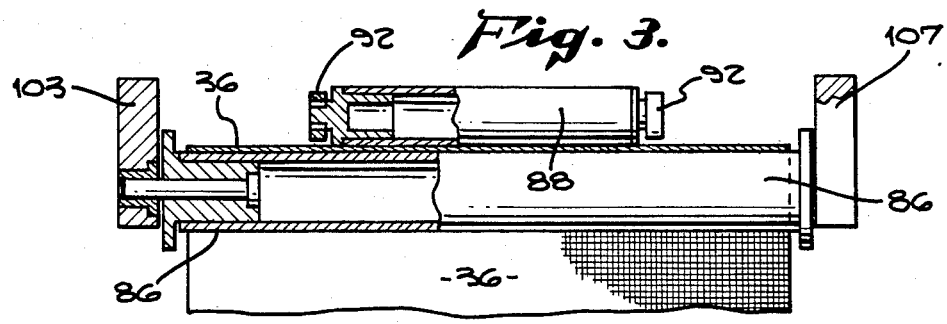
FIG. 3 is a sectional view of FIG. 2 taken in the III—III plane.

A preferred exemplary apparatus for making fiberized substrate material in accordance with the present invention is shown generally at 10 in FIGS. 1 and 2. The apparatus 10 includes a container 12 having a bottom 14, sides 16 and an open top 18 through which access into the container is provided. The container 12 defines a fiber forming zone 20 for holding fiber forming polymer solutions 22. The fiber forming polymer solutions 22 may be any of the known fiber forming polymer solutions set forth in the patents listed in the Description of Related Art. The polymer forming solutions are typically high molecular weight, noncrosslinked or linear polymers having a hich degree of crystallinity. Suitable polymers include polyalkenes, such as polyethylene, polypropylene, polybutene, poly (4-methyl-1-pentene) and the like. Linear polymers such as polyvinylidene fluoride, polychlorotrifluoroethylene, linear polyesters, and acrylics of polyamides may also be used. Copolymers of the alkene monomers may also be used, such as propylene-acrylic acid copolymers. The solutions also include a processing solvent whose boiling point is usually moderately high, such as mixed xylene, styrene or Decalin. The various solvents are selected for compatability with the various polymers as set forth in the previously mentioned patents, the contents of which are hereby incorporated by reference.

In order to sufficiently dissolve the various polymers in the chosen solvent, it is generally necessary to heat the solvent and maintain temperatures in the range of from 110° C. to 140° C. Means for maintaining the temperature of the fiber forming polymer solution 22 within the desired range is provided by mounting the entire container 12 within a heating bath 24. Other means may be provided for maintaining the desired temperature of the fiber forming solution 22. The heating bath 24 includes an outer vessel 26 having a bottom 28, side walls 30 and a top 32. The top 32 includes an access opening 34 through which the belt 36 may be passed into the fiber forming zone 20. A heat control fluid 38, such as water or oil, is provided in the heating bath 24 in order to insure a constant and uniform temperature within the fiber forming zone 20. A heating element (not shown) may be located inside the vessel 26 or outside the vessel 26 to provide the necessary heating and temperature control of heat control fluid 38. Fiberization is performed by isothermal agitation at a constant solution temperature which is a few degrees (e.g. 5° to 10° C.) above the supercooled temperature, i.e. the temperature at which the polymer crystallizes from solution. Accordingly, it is necessary that the heating element be controllable to provide the necessary temperature control to carry out isothermal fiber formation.

Support structures 40 are provided to locate the fiber forming container 12 centrally within the heating bath 24 in order to insure maximum circulation and contact between the heat control solution 38 and the container 12.

The apparatus 10 is designed to pass belt 36 vertically down into the fiber forming zone 20 as represented by arrow 42 in FIG. 2. Further, the belt is redirected vertically up out of the fiber forming zone 20 as indicated by arrow 44. The belt 36 is passed through the fiber forming zone 20 at a constant rate while the apparatus, as will be described in detail below, imparts an oscillating or reciprocating movement to the belt. The belt is an important element of this invention since the belt must be of suitable size and shape to provide the desired deposition of fibrous sheet material thereon. The belt must also be sufficiently strong to withstand the stresses produced during oscillation. The belt may be of any reasonable width and thickness and may have various weaves and densities. Materials which can be suitably used to provide an acceptable belt include polyaramide material (KEVLAR), glass, and nylon. Any belt material may be utilized so long as it is structurally strong and inert to the various solvents and polymers being utilized. The belt must also provide a suitable substrate around and throughout which the fibrous sheet material can grow via crystallization.

First pulley means, such as the first pulley assembly shown generally at 46 in FIG. 2, are provided for directing the belt 36 vertically down into the fiber forming zone 20 through access opening 34. The pulley assembly 46 includes a main pulley 48 to which belt 36 is passed from idler pulley 50. The idler pulley 50 may be mounted to the apparatus in any convenient manner such as by mounting bracket 52. Preferably, the idler pulley 50 is positioned so as to introduce belt 36 horizontally to the main pulley 48.

Means for biasing the belt 36 against the main pulley 48 is provided by biasing pulleys 54 and 56. The biasing pulleys 54 and 56 are mounted to fulcrum 58 by way of a pivoting mounting bracket 60. The fulcrum 58 is spring biased by spring 62 (see FIG. 4) to maintain a constant biasing force on biasing pulleys 54 and 56 against the main pulley 48. The biasing pulleys 54 and 56 are necessary in order to prevent the belt 36 from raising up off of main pulley 48 during oscillation of belt 36.

Second pulley means, such as the rocker arm assembly shown generally at 64 in FIG. 2, is located within the fiber forming zone 20 for receiving the belt 36 from the first pulley assembly 46 and directing the belt 36 vertically upward and out of the fiber forming zone 20 through the access opening 34. The rocker arm assembly 64, as best shown in FIGS. 2, 4 and 7, includes a rocker arm 66 which is pivotally mounted at 68 to a vertical support structure shown generally at 70. The vertical support structure 70 includes upper bracket 72, parallel support tubes 74 and 76 and lower bracket 77. The support structure 70 is preferably made from a relatively strong inert material, such as stainless steel or similar type of metal.

A first rocker arm pulley 78 is mounted at one end of the rocker arm 66 for receiving the belt 36 from the first pulley assembly 46. The pulley 78, as well as all of the other pulleys utilized in this apparatus are preferably mounted to their respective support structures utilizing any suitable rotatable mounting mechanism such as ball bearings or bushings. Either bushings or ball bearings are the preferred means for rotatably mounting the pulleys. A second rocker arm pulley 82 is rotatably mounted at the other end of the rocker arm 66 for receiving the belt from the first rocker arm pulley 78 and directing the belt 36 vertically upwards to a third pulley assembly shown generally at 84.

The third pulley assembly 84 is similar to the first pulley assembly 46 in that it also includes a main pulley 86 and two biasing pulleys 88 and 90. The two biasing pulleys 88 and 90 are rotatably mounted to pivot bracket 92 which in turn is pivotally mounted to fulcrum 94. The fulcrum 94 is spring biased by spring 96 to provide biasing of the pulleys 88 and 90 against the main pulley 86. A second idler pulley 98 is provided for receiving the belt 36 from main pulley 86 and directing the belt 36 to a constant rate take-up reel as will be discussed further below. As was the case with idler pulley 50, it is preferred that a mounting bracket 101 be provided so that idler pulley 98 is positioned so that belt 36 is removed in a substantially horizontal direction from main pulley 86. It should be noted that the belt 36 is coated and/or impregnated with freshly formed fibrous material as it leaves the fiber forming zone 20 and passes over main pulley 86 and main idler pulley 98. From this point, the belt may be directed by additional pulleys through cleaning and drying chambers, if required, prior to entering the take-up reel.

A horizontal pivot bar shown generally at 100 includes two plates 103 and 107 which are pivotally mounted to the upper bracket 72 as shown at 102 and 109. The rectangular mounting axle 104 (see FIGS. 4 and 5) utilized to mount the horizontal pivot bar 100, not only provides mounting of the pivot bar 100, but also provides a stop surface against which springs 62 and 96 can be energized. The rectangular mounting axle is connected to plates 103 and 107 by way of screws 115 to provide a rigid connection and fixed spacing of pivot bar plates 103 and 107.

The pivot bar plates 103 and 107 each includes a cam lobe or arm 105 which is located above the pivot point of axle 104 to thereby provide vertical movement of the first and second pulley assemblies 46 and 84 in opposite directions over a given pivot distance as the cam lobes 105 are displaced horizontally by cam arm 106. The cam arm 106 is connected to drive motor 108 which in turn is mounted on a suitable support structure 110. Preferably, the cam drive motor 108 is a variable rpm motor so that oscillating frequencies on the order of 20 to 200 hertz (Hz) may be applied to the pivoting bar 100. The motor should also be of sufficient horsepower to be able to drive both the pivoting bar 100 and the rocker arm assembly 64 at the desired frequency for depositing fibrous sheet material on belt 36 from the fiber forming polymer solution 22.

The rocker arm assembly 64 and horizontal pivot bar plates 103 and 107 are connected together by connecting rods or wires as shown at 112 and 114 respectively. The rods or wires 112 and 114 insure that the rocker arm assembly 64 and horizontal pivot bar 100 are interconnected and pivot in a coordinated pivoting movement, i.e. they pivot together in unison. The combined pivoting movement of the rocker arm assembly 64 and the pivot bar 100 provides an oscillating or reciprocating movement of the belt 36, as represented by double headed arrow 113 as the belt moves through the fiber forming zone 20. It was found in accordance with the present invention that the oscillating or reciprocating movement 113 of belt 36 provided by the pivot arm 100 and rocker assembly 64 produces sufficient agitation to result in the fiberization of the belt 36 with fibrous material.

It is preferred that the belt 36 be passed throuqh the fiber forming zone 20 at a constant rate. A delivery reel 116 (see FIG. 1) is provided for delivering the belt 36 to the first pulley assembly 46 at a constant rate. The delivery reel 116 is preferably driven by a conventional torque motor (not shown) to maintain tension on belt 36 between reel 116 and idler pulley 50. Further, a radius sensing potentiometer as represented at 118 is provided to control the rotational speed of reel 116 to insure constant delivery rate of belt 36. Both the torque motor and radius sensing potentiometer are conventional items whose operation are well known. A take-up reel 120 is provided for receiving the belt 36 from the second idler pulley 98. The idler pulley 120 is also driven by a conventional torque motor (not shown) with the radial velocity of the take-up reel 120 also being controlled by a radius sensing potentiometer as represented at 122. Controls are provided as represented schematically at 124 to coordinate the take-up reel 116 and 120 so that a preselected constant belt speed and proper belt tension are maintained throughout the belt 36 circuit through the fiber forming zone 20. The belt speed may be varied to provide the desired degree of impregnation and/or coating of the belt with fibrous material. Typically, the belt speed will be selected to provide a residence time for the belt in the polymer solution of between about 5 minutes to 20 minutes.

Figure 9:
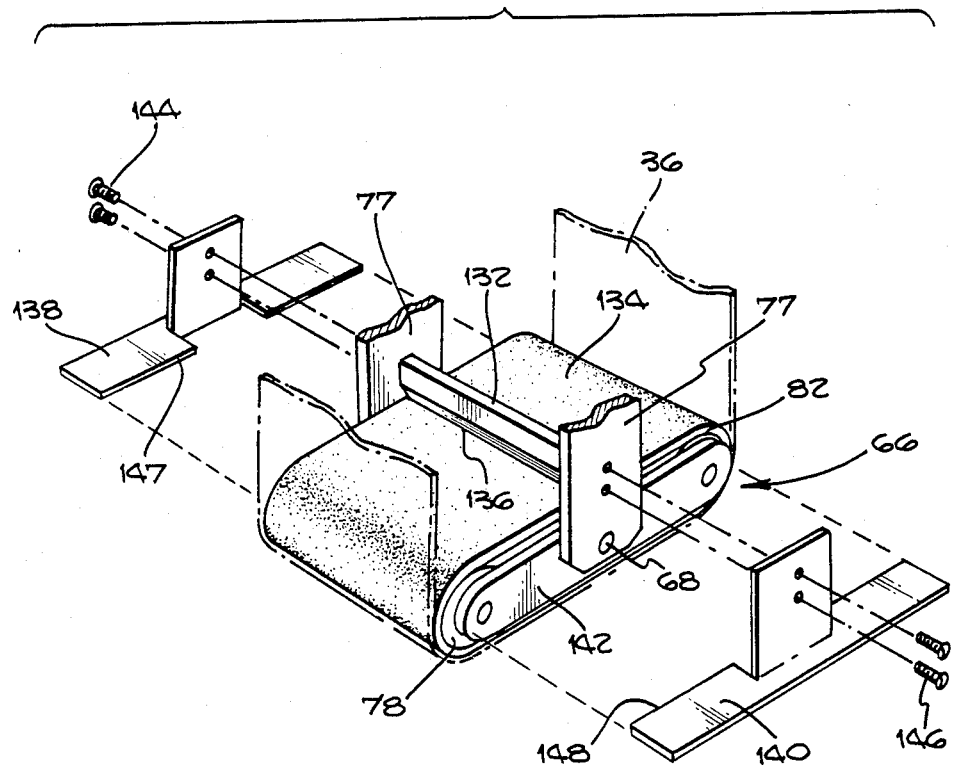
FIG. 9 is a preferred exemplary rocker arm assembly which includes rocker arm scraper means for removing fibrous material from the rocker arm and a continuous support band extending between the two rocker arm pulleys.
Figure 10:
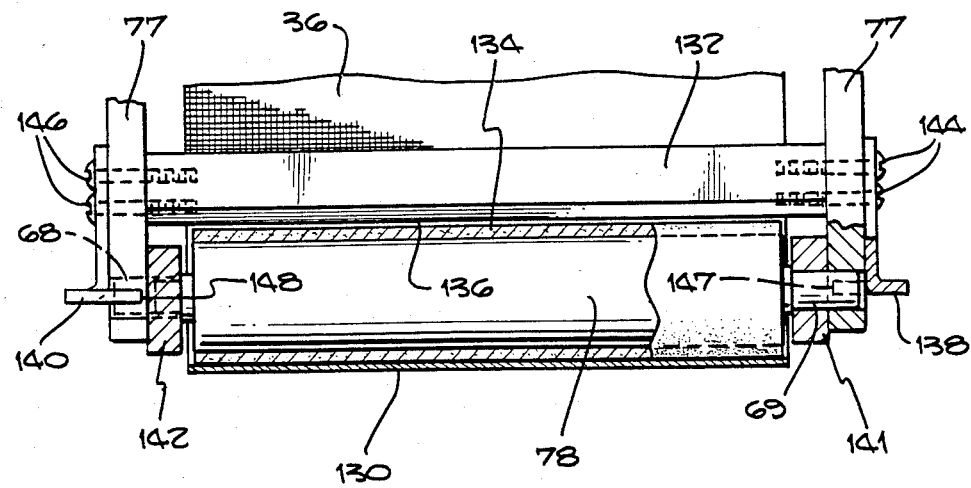
FIG. 10 is a side view of the rocker arm assembly shown in FIG. 9.

As a feature of the present invention, a continuous support band 130 is provided as shown in FIGS. 9 and 10 to provide support for belt 36 as it passes from the first rocker arm pulley 78 to the second rocker arm pulley 82. The support band 130 is especially preferred where high frequency pivoting of the rocker arm 66 is utilized to provide the necessary high frequency oscillation of belt 36 for fibrous sheet formtion. The higher frequencies develop more stress in the belt 36 so that the support band 130 is useful in reducing stresses in the belt and prolonging belt life.

A band scraper 132 is provided for removing fibrous sheet material which forms on the outer surface 134 of the band 130. The scraper 132 includes a lower edge 136 which contacts the band surface 134 to provide the desired scraping.

The rocker arm 66 as shown in FIGS. 9 and 10 includes two plates 141 and 142. Stationary scraper blades 138 and 140 are preferably mounted to the lower bracket 77 to provide continuous scraping of the outer surfaces of the rocker arm plates 141 and 142 during pivoting of the rocker arm 66. The scraper blades 138 and 140 are securely mounted to the lower brackets 77 by way of screws 144 and 146 respectively. The lower bracket 70 remains stationary as the rocker arm 66 pivots about pivot point 68 and 69. The inner edges 147 and 148 of the scraper plate 138 and 140, respectively, contact the outer surfaces of rocker arm plates 141 and 142 to thereby continually remove any buildup of fibrous sheet material which may form on these outer side surfaces of the rocker arm 66.

An alternate embodiment in accordance with the present invention is shown generally at 150 in FIG. 8. The alternate embodiment is the same as the embodiment shown in FIG. 1 except that the rocker arm assembly 64 utilized in the previously discussed preferred embodiment is replaced by a single pulley assembly 152. The pulley 152 includes a single reel 154 which is rotably mounted at 156 to mounting flange 158. The mounting flange 158 is secured to the bottom 14 of the container 12.

If desired, the belt 36 as shown in FIG. 8 may be supported by a continuous belt 160 which is shown in phantom. The continuous belt 160 is continually rotated around the outside of the apparatus by way of additional pulleys 162 and 164. Supports 168 and 170 are provided to allow passage of the continuous belt 160 completely around the outer vessel 26. A torsion spring, lever arm and pulley shown schematically at 163 is preferably provided to maintain tension on the belt 160.

The apparatus shown in FIG. 8 may also be used to produce bulk fibrous material if desired. The belt 36 is deleted and the continuous band 160 is continually cycled through the solution 22. As fibrous material builds up on the band 160, it is continually scraped off by the scraper shown schematically at 166 and recovered. A suitable drive means (not shown) to circulate the band 160 is required.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited to the specific embodiments as illustrated herein, but is only limited by the following claims.

What is claimed is:

1. An apparatus for fiberizing a belt shaped substrate with fibrous material from a fiber forming polymer solution comprising:
   (a) a container having a bottom, sides and a top which define a fiber forming zone for holding fiber forming polymer solution wherein the container top includes a surface defining an access opening to provide access to the fiber forming zone;
   (b) a belt having a top, a bottom and two sides;
   (c) first pulley means for directing the belt vertically down into the fiber forming zone through the access opening;
   (d) second pulley means located within the fiber forming zone for receiving the belt from the first pulley means and directing the belt vertically upward and out of the fiber forming zone through the access opening;
   (e) means for mounting the second pulley means within the fiber forming zone;
   (f) third pulley means for receiving the belt from the second pulley means;
   (g) a horizontal pivot bar located above the second pulley means, the pivot bar having a first end, a second end and a middle pivot point;
   (h) means for mounting the first pulley means to the first end of the pivot bar;
   (i) means for mounting the third pulley means to the second end of the pivot bar;
   (j) means for introducing the belt into the fiber forming zone at a constant rate and for removing the belt from the fiber forming zone at the same constant rate; and
   (k) pivot means for pivoting the pivot bar about the middle pivot point to vertically move the first and third pulley means in a pivoting movement in opposite directions over a pivot distance and at a pivot frequency to provide oscillation of the belt as the belt passes through the polymer solution, the pivot distance and pivot frequency being sufficient to produce a sufficient oscillation of the belt within the polymer solution to provide fiberization of said belt with the fibrous material as the belt passes through the fiber forming zone.

2. An apparatus for fiberizing a belt shaped substrate with fibrous material according to claim 1 wherein said second pulley means includes a single pulley.

3. An apparatus for fiberizing a belt shaped substrate with fibrous material according to claim 1 wherein said second pulley means includes:
   a rocker arm having a first end, a second end and a middle rocker pivot point;
   a first rocker arm pulley mounted at the rocker arm first end for receiving the belt from the first pulley means;
   a second rocker arm pulley mounted at the rocker arm second end for receiving the belt from the first rocker arm pulley and directing the belt to the third pulley means; and
   means for providing coordinated pivoting movement of the rocker arm with the pivot bar about the middle rocker pivot point.

4. An apparatus for fiberizing a belt shaped substrate with fibrous material according to claim 3 which includes a rocker arm support structure having an upper end located outside the fiber forming zone and a lower end located within the fiber forming zone and wherein the pivot bar is pivotally mounted at the middle pivot point to the rocker arm support structure upper end and the rocker arm is pivotally mounted to the rocker arm support structure lower end, the apparatus further including means for mounting the rocker arm support structure to the container top so that the rocker arm support structure extends vertically into the fiber forming zone.

5. An apparatus for fiberizing a belt shaped substrate with fibrous material according to claim 4 wherein the means for providing coordinated pivoting movement of the rocker arm with the pivot bar includes means for connecting the pivot bar first end to the rocker arm first end for connecting the pivot bar second end to the rocker arm second end to provide the coordinated pivoting of the pivot bar and rocker arm.

6. An apparatus for fiberizing a belt shaped substrate with fibrous material according to claim 3 further including a continuous support band extending around the first and second rocker arm pulleys, the support band having two edges, an inner surface which contacts the rocker arm pulleys and an outer surface which contacts and supports the belt.

7. An apparatus for fiberizing a belt shaped substrate with fibrous material according to claim 6 which further includes band scraper means for removing excess fibrous material which forms on the outer surface of the band.

8. An apparatus for fiberizing a belt shaped substrate according to claim 6 which further includes rocker arm scraper means for removing any excess fibrous material which forms on the rocker arm.

9. An apparatus for fiberizing a belt shaped substrate with fibrous material according to claim 6 wherein the rocker arm includes:
- a first rocker arm plate having an inside surface and an outside surface;
- a second rocker arm plate having an inside surface and an outside surface; and
- means for rotatably mounting the first and second rocker arm pulleys between the inside surfaces of the first and second rocker arm plates wherein the rocker arm scraper means includes first and second stationary scraper blades located adjacent to the outside surfaces of the first and second rocker arm plates, respectively, to provide scraping of excess fibrous material from the outside surfaces of the first and second rocker arm plates during pivoting movement of the rocker arm.

10. An apparatus for fiberizing a belt shaped substrate with fibrous material according to claim 1 wherein the first pulley means includes a main pulley and means for biasing the belt against the main pulley as the belt travels over the main pulley.

11. An apparatus for fiberizing a belt shaped substrate with fibrous material according to claim 10 wherein the means for biasing the belt against the main pulley includes one or more biasing pulleys which are spring biased to push the belt against the main pulley to thereby maintain contact between the belt and main pulley during oscillation of said belt.

12. An apparatus for fiberizing a belt shaped substrate with fibrous material according to claim 10 wherein the third pulley means includes a main pulley and means for biasing the belt against the main pulley as the belt travels over the main pulley.

13. An apparatus for fiberizing a belt shaped substrate with fibrous material according to claim 12 wherein the means for biasing the belt against the main pulley includes one or more biasing pulleys which are spring biased to push the belt against the main pulley to thereby maintain contact between the belt and the main pulley during oscillation of said belt.

14. An apparatus for fiberizing a belt shaped substrate with fibrous material according to claim 1 wherein the means for introducing and removing the belt from the fiber forming zone includes delivery reel means for delivering the belt to the first reel means at a constant tension and take up reel means for receiving the belt from the third pulley means at a constant rate.

15. An apparatus for fiberizing a belt shaped substrate with fibrous material according to claim 1 wherein said belt is a continuous belt and means are provided for continuously cycling the belt back to the first pulley means from the third pulley means.

16. An apparatus for fiberizing a belt shaped substrate with fibrous material according to claim 15 which further includes bulk product recovery means for separating bulk fibrous material from the belt after the belt has left the fiber forming zone.

17. An apparatus for fiberizing a belt shaped substrate with fibrous material according to claim 1 wherein the horizontal pivot bar includes a vertical cam arm portion extending vertically above the pivot bar pivot point and wherein the pivot means includes cam drive means connected to said cam arm portion for providing horizontal reciprocal movement of the cam arm portion to thereby pivot the pivot bar about the pivot point.

* * * * *

UNITED STATES PATENT AND TRADEMARK OFFICE
CERTIFICATE OF CORRECTION

PATENT NO. : 4,642,038

DATED : February 10, 1987

INVENTOR(S) : NATHAN R. KRAMER

It is certified that error appears in the above—identified patent and that said Letters Patent is hereby corrected as shown below:

Claim 9, line 2, delete "6" and insert therefor --8--.

Signed and Sealed this

Tenth Day of November, 1987

Attest:

DONALD J. QUIGG

*Attesting Officer*  *Commissioner of Patents and Trademarks*